United States Patent [19]

Seemann

[11] 4,253,566
[45] Mar. 3, 1981

[54] RESIN-CONTAINING CARTRIDGES AND PROCESS FOR SEALING SOLID STRUCTURES OR FOR ANCHORING BOLTS AND RODS THEREIN

[75] Inventor: Ronald W. Seemann, Roseville, Minn.

[73] Assignee: Minnesota Mining and Manufacturing Company, St. Paul, Minn.

[21] Appl. No.: 67,044

[22] Filed: Aug. 16, 1979

[51] Int. Cl.³ .............................................. B65D 25/08
[52] U.S. Cl. .................................. 206/220; 206/222; 405/259
[58] Field of Search ...................... 206/219, 220, 222; 405/259, 261, 260

[56] References Cited

U.S. PATENT DOCUMENTS

| 2,952,129 | 9/1960 | Dempsey | 61/45 B |
|---|---|---|---|
| 3,108,443 | 10/1963 | Schuermann | 61/45 B |
| 3,324,663 | 6/1967 | McLean | 61/36 R |
| 3,698,196 | 10/1972 | Jankowski et al. | 61/45 B |
| 3,699,687 | 10/1972 | Bourland | 61/45 B |
| 3,731,791 | 5/1973 | Fourcade et al. | |
| 3,737,027 | 6/1973 | Ball | |
| 3,877,235 | 4/1975 | Hill | 61/45 B |
| 3,921,800 | 11/1975 | Burns | 206/219 |
| 3,925,996 | 12/1975 | Wiggill | |
| 3,938,420 | 2/1976 | Draa | |
| 4,096,944 | 6/1978 | Simpson | 206/219 |
| 4,153,156 | 5/1979 | Seemann et al. | 206/219 |

FOREIGN PATENT DOCUMENTS 2249834 4/1974 Fed. Rep. of Germany.

*Primary Examiner*—Joseph Man-Fu Moy
*Attorney, Agent, or Firm*—Cruzan Alexander; Donald M. Sell; James A. Smith

[57] ABSTRACT

A cartridge for sealing solid structures or for anchoring bolts or the like therein, having a multi-component resin system with at least one component in a pressure rupturable container, a liquid-permeable mixer assembly at one end of said container, and means for selectively rupturing said container adjacent the mixer assembly, and processes for the use thereof.

5 Claims, 4 Drawing Figures

RESIN-CONTAINING CARTRIDGES AND PROCESS FOR SEALING SOLID STRUCTURES OR FOR ANCHORING BOLTS AND RODS THEREIN

FIELD OF THE INVENTION

The present invention relates to a resin-containing cartridge for sealing solid structures or for anchoring rods, bolts and the like in a hole therein and to a process for such sealing or anchoring using a resin-containing cartridge and a multi-component, curable resin system.

DESCRIPTION OF THE PRIOR ART

The use of organic resins for rock stabilization and for anchoring rods in rock or masonry is well known, e.g., U.S. Pat. No. 2,952,129. In the 1959 U.S. Bureau of Mines Report of Investigation 5439 ("Cementation of Bituminous Coal Mine Roof Strata," Injection of Epoxy and Polyester Type Resins, E. R. Maize, R. M. Oitto, Jr.), the pumping of curable two-part epoxy or polyester resin systems into rock was shown to produce rock stabilization. Various approaches have been made to introduce a two-part resin system into a bore hole as represented in U.S. Pat. Nos. 3,108,443; 3,324,663; 3,698,196; 3,877,235 and 3,925,996. However, to insure intimate mixing of the several resin forming components the rod has been rapidly rotated in the bore hole, a cumbersome step which caused loss of time and required auxiliary equipment and which, if not carefully controlled, can result in excessive mixing (i.e., mixing past the gel point) or undermixing.

In U.S. Pat. No. 3,731,791 the reactive components have been placed in a frangible container where their separation is accomplished solely by a layer of reaction product, but rod rotation is still required to achieve full mixing. In order to increase the mixing of the various parts of the curable polymer system German OLS No. 2,249,834 describes the use of microcapsules (polyethylene polyamide or similar polymer) with a curable resin system encapsulated therein, the diameter of the microcapsules being as large as 8 mm, preferably less than 1 mm, to create a satisfactory mixture of the proper proportions. As the rod is inserted into the hole, the microcapsules rupture and the resin system cures to reinforce the surrounding structure. Although in such a system the dispersion of the extremely small diameter microcapsules (i.e., less than 1 mm) does tend to insure better initial dispersion of the resin components, such small microcapsules tend to be difficult to rupture with the bolt or rod, even with rod rotation.

In U.S. Pat. No. 4,153,156 a sealing cartridge is provided with at least one of the curable resin components contained in macrocapsules which, upon rupture, produce flake-like fragments that promote mixing of the resin components without the need for rod rotation.

SUMMARY OF THE INVENTION

This invention provides an improved resin-containing cartridge for anchoring bolts or rods in solid structures, reinforcing solid structures and the like with a multi-component curable resin system (i.e., two or more components which when mixed together effect the reaction or cure to form a polymer or resin of higher molecular weight than any of the initial reactive components). Inadequate mixing of the curable components tends to produce a product with less than optimum physical properties. When the user of a conventional resin-containing cartridge does not carefully follow the instructions, particularly if the rod or bolt must be rotated to mix the components, inadequate mixing can result. The resin-containing cartridges of this invention incorporate mixing means as an integral part of the cartridge assembly, and the mixing means does not require the time and power consuming steps associated with rod rotation. Indeed, these cartridges are easily installed and are both activated and mixed by a simple insertion procedure, inserting first the cartridge and then effecting cartridge rupture and mixing as the bolt or rod compresses or crushes the resin containing cartridge at the inner end of the bore hole.

The unique unitary resin-containing cartridges of this invention comprise (a) a generally cylindrical, rupturable container containing at least one liquid component of a multi-component curable resin system, (b) integral therewith, at one end of and in axial alignment with said container, a mixer comprising a liquid-permeable, three-dimensional matrix having a plurality of continuous flowpaths therethrough, essentially all of these flowpaths being non-linear, and (c) means for selectively rupturing said container at the end thereof adjacent said mixer assembly. After such cartridges are inserted into a bore hole and the rod or bolt forces them to the inner end of the hole, the further inward motion of the rod or bolt causes the generally cylindrical container to selectively rupture at the end adjacent the mixer assembly. Further motion of the rod or bolt forces the liquid curable resin component or components in the rupturable container through the adjacent mixer assembly (or the mixer assembly through the curable resin component), whereby the several curable components are mixed as they pass through the mixer assembly, thereby initiating the curing reaction. Since the mixer assembly is preformed and integral with the rupturable container, it remains effective from the time of initial container rupture until the final passage of the curable materials through its three-dimensional matrix.

DETAILED DESCRIPTION

Figure 1:
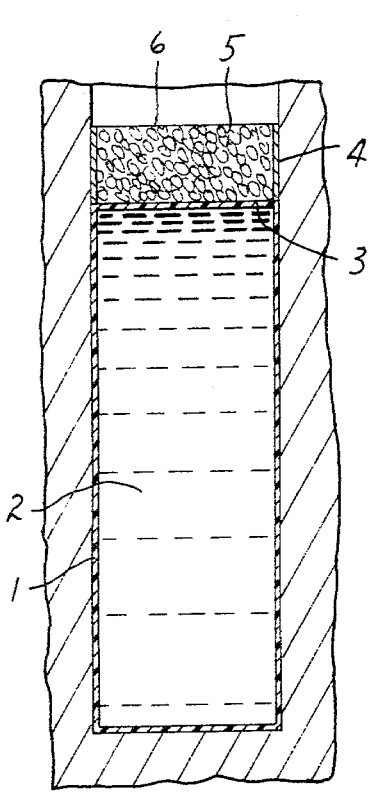
FIG. 1 is a cross sectional view of a cylindrical resin-containing cartridge having a plastic container with a curable resin component and an adjacent cylindrical mixer assembly formed from an inorganic aggregate.

In the resin-containing cartridge of the present invention the generally cylindrical, rupturable container contains one or more components of a multi-component curable resin system. If two or more components are present, they are sufficiently segregated to prevent the curing reaction from being initiated. As the components necessary for cure are mixed together, the curing reaction begins. A variety of means for effecting the physical separation of the curable components are known, such as encapsulation, retention in separate compartments, etc. Any multi-component curable resin system in which the major components are liquid and which is capable of curing to a hard resin can be used. Although systems curing under ambient conditions are greatly preferred, in some applications it may be desirable to supply heat to the mixture, for example, by pre-heating the cartridge and/or the rod before use. Curable systems which generate a gas upon curing produce a foamed resin, and the pressure generated by the gas can be advantageous in assisting the mixing of the components and in forcing the curing resin mixture into any cracks or fissures in the walls of the bore hole, which serve to reinforce the surrounding solid structure. Foaming, curable mixtures may therefore be particularly desirable for many applications, such as mine roof reinforcement.

Epoxy resin systems are described in U.S. Bureau of Mines Reports of Inventigation Nos. 5439 (E. R. Maize and R. H. Oitto, Jr. 1959) and 7907 (R. V. Subramanian, H. Austin, R. A. V. Raff, and J. C. Franklin, 1973), the former also including polyester type resins. Polyurethane, melamine- or urea-formaldehyde systems are also very ueful, see U.S. Pat. No. 3,698,196 and Gluechauf, Vol. 108, pages 582-4 (Alfons, Jankowski). Liquid curable systems in which all the reactants are liquid under the ambient conditions of use are preferred to facilitate mixing and to improve resin impregnation of the surrounding solid structure. The water curable systems have the advantage of curing in water-wetted structures, e.g., rock formations in mines. Not every part of the multi-part curable system need be contained in the cartridge, and some parts may be added to the cure site before inserting the cartridge into the bore hole. Furthermore, not all parts need be included in the rupturable container, and it may be desirable to include one or more parts in the mixer assembly portion of the sealing cartridge.

The generally cylindrical, rupturable container is preferably a collapsible plastic, metal foil or paper tube with closed ends. If the container has more than one component in separate compartments or capsules, those compartments or capsules must also be rupturable when the metal rod or bolt is forced against the resin-containing cartridge at the end of the bore hole. Adjacent to one end of the rupturable container and in axial alignment with it, preferably separated from the container by a suitable spacer, is a mixer comprising a liquid-permeable, three dimensional, unitary matrix having a plurality of continuous flowpaths therethrough, essentially all of these flowpaths being non-linear. It is this mixer assembly which receives all of the components of the curable resin system and effects their mixing to a degree insuring adequate cure. Although the curable resin system may have some solid components, such as a catalyst, the principal components are liquid and thus can be forced through the mixer assembly under pressure. In a preferred embodiment one of the components of the curable system may be contained in the mixer assembly, and the curing catalyst is particularly effective when so used. As such, the catalyst should be incorporated into the mixer matrix such that it is not readily flushed out by the initial resin flow, e.g., it may be coated onto or embedded in the matrix.

The mixer assembly serves to mix the various components of the curable resin system by causing their commingling as the liquid components are forced through the mixer's non-linear flowpaths. Any structural configuration which permits such commingling of components can be employed, and the mixer can, for example, conveniently be a porous inorganic aggregate, a stack of spaced perforated plates, a mass of fibers or filaments, a container filled with broken glass particles or steel wool and having perforated ends, etc. Preferably the mixer assembly is a rigid or compressible cylindrical matrix, but it should not compress to the extent it loses its liquid permeability under pressure. One of the advantages of such mixer assemblies is the relatively uniform or controlled degree of mixing of all of the liquid components, even though the mixing is incremental, i.e. the first liquid to exit the mixer has received essentially the same degree of mixing as the last liquid to exit the mixer assembly. One might term this type of mixing as "uniform incremental liquid mixing." In the conventional mixing of resin components by rotating the rod or bolt in the ruptured resin cartridge, one of the problems is to regulate the amount of rod rotation. If the time is too short, unsatisfactory mixing occurs. If the time is excessive, the resin can enter the gel stage with a consequent loss of desired physical properties in the cured resin. By using the mixer of this invention as part of a unitary resin cartridge, the degree of mixing can be readily controlled.

Means are provided for selectively rupturing the rupturable container at the end adjacent the mixer assembly. This insures the flow of the container's contents into and through the mixer assembly. This can be accomplished, for example, by providing the container with a weakened end portion facing the mixer, as by employing a plastic film of lesser strength than the remaining portions of the container wall or by scoring the plastic film to decrease its resistance to rupture. Another illustrative means is the inclusion of a perforated metal disc with sharpened edges facing the container, which will rupture the container as the cartridge is compressed by the bolt or rod.

The rupturable container portion of the sealing cartridge is normally first introduced into the bore hole, and the rod or bolt bears against the mixer assembly end of the cartridge. If the end of the bolt is shaped such as to completely cover the outer or exit face of the mixer assembly, a spacer may be introduced between the cartridge and the bolt to prevent the bolt from completely sealing the exit face of the mixer. However, even if the bolt seals off a major portion of the mixer exit face, it has been found that the desired performance can be realized, although the pressure required on the bolt may need to be somewhat increased.

In the sealing cartridge of FIG. 1 a collapsible plastic-walled cylinder 1 serves as the rupturable container for a liquid curable resin component 2, and the plastic cylinder end 3 is scored to facilitate its rupture. Attached to the plastic cylinder 1 is a mixer assembly having a liquid-impermeable cylindrical wall 4 which radially surrounds a cylindrical porous cohesive inorganic aggregate 5 but does not cover either the upper end of the aggregate adjacent plastic cylinder end 3 or the lower end 6 of the aggregate. A curing catalyst for the liquid resin component 2 is contained on the surface of the aggregate 5. As the bolt or rod, in contact with the lower end 6 of the cylindrical aggregate, forces the cartridge into contact with the inner end of the bore hole, the mixer assembly is forced into the plastic cylinder 1, causing its end 3 to rupture and gradually collapsing the plastic cylinder 1. As a result the liquid curable resin component 2 is forced into and through the aggregate functioning as a mixer assembly, where it is mixed with the curing catalyst to initiate its cure. After exiting from the mixer assembly, it surrounds the end of the rod or bolt and completes the curing reaction, sealing the rod or bolt in the bore hole.

Figure 2:
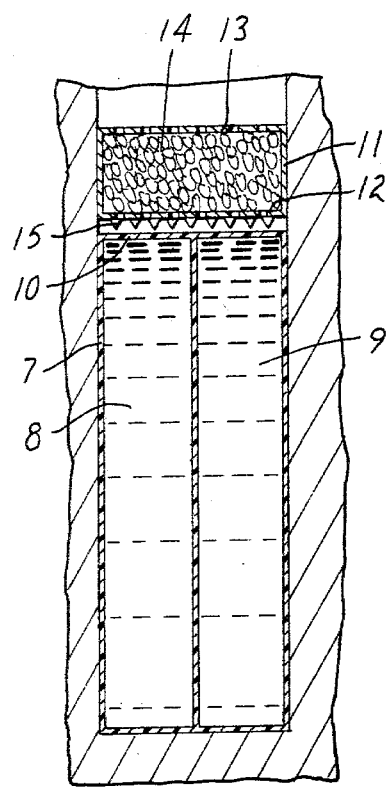
FIG. 2 is a cross sectional view of another resin-containing cartridge having a two-compartment plastic container for two of the resin components and an adjacent fibrous mixer assembly.

In FIG. 2 a rupturable plastic-walled container 7 contains separate compartments 8 and 9 for two curable resin components. Attached to one end of a plastic-walled container 7 having a rupturable membrane 10 is a mixer assembly comprising a cylindrical sleeve 11 which, together with perforated end plates 12 and 13, contains a mass of glass fragments 14. Adjacent to perforated end plate 12 is a perforated rupture disc 15 which has sharp edges facing the rupturable membrane 10. As in the cartridge of FIG. 1, the bolt forces the mixer assembly into the plastic-walled container 7, and the sharp edges of rupture disc 15 penetrate and rupture membrane 10, causing the two curable resin components to flow through the glass fragments 14 and become sufficiently mixed before exiting through end plate 13 and hardening around the end portion of the bolt.

Figure 3:
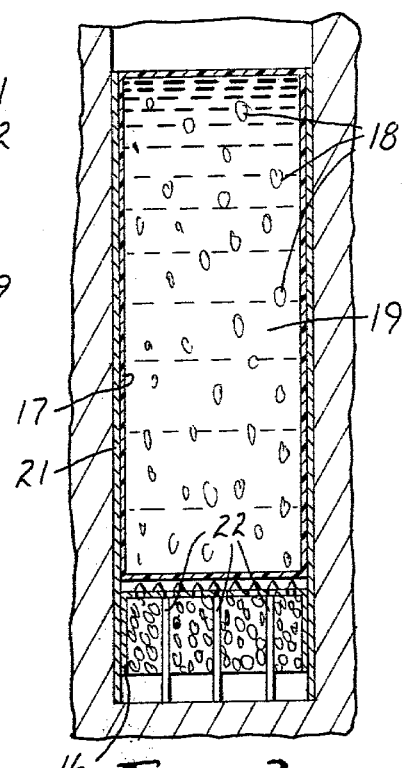
FIG. 3 is a cross sectional view of a third resin-containing cartridge having a rupturable container in which one curable resin component is contained within capsules dispersed in another curable resin component, an adjacent mixer assembly and a rigid perforated chamber on the opposite side of the mixer assembly.

The sealing cartridge of FIG. 3, unlike the cartridges of FIGS. 1 and 2, is preferably inserted into a bore hole with the mixer assembly 16 preceding the rupturable container 17. A plastic-walled container 17 containing one curable liquid resin component in encapsulated form 18 and a second curable resin component as a continuous liquid phase 19 is separated from the cylindrical mixer assembly 16 by a perforated rupture disc 20, and both the plastic-walled container and the mixer assembly are positioned inside of an open-ended crushable paperboard cylinder 21. Several metal spacing studs 22 are embedded in the mixer assembly 16, attached at one end to the rupture disc 20 and extending outside the mixer assembly at the other end. In use, the bolt forces the plastic-walled container against the rupture disc, making multiple large perforations therein, and crushing the paperboard cylinder 21 as it moves progressively into the cartridge. The spacing studs 22 contact the end of the bore hole. The pressure of the advancing bolt also causes rupture of the encapsulated resin component, and both resin components flow through the perforated rupture disc 20 and into the mixer assembly 16, where they are mixed before they leave the mixer assembly. The spacing studs allow the mixed components exiting from the mixer assembly to fill the annular space surrounding the collapsed cartridge and the end of the bolt, where their cure is completed, and the bolt is thereby sealed in the bore hole.

Figure 4:
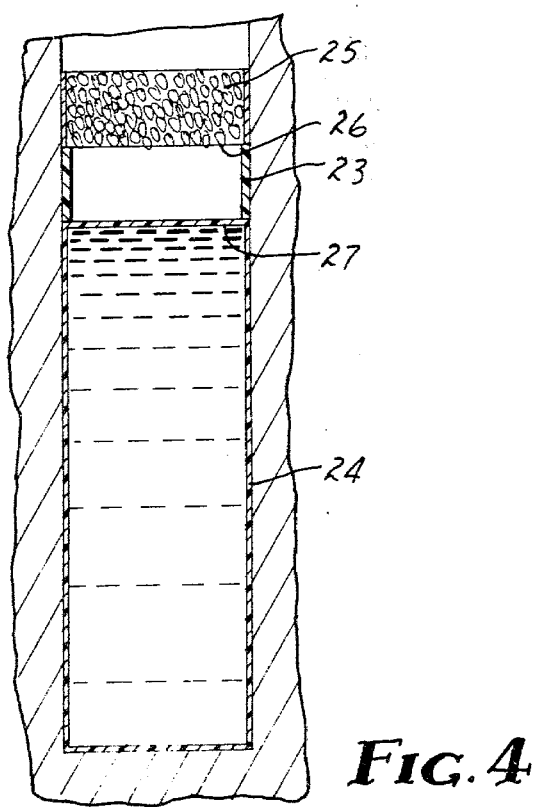
FIG. 4 is a cross sectional view of still another resin-containing cartridge having a plastic container with one curable resin component, an adjacent mixer assembly having resin curing catalyst therein, and a spacer between the mixer assembly and the plastic container to improve the liquid flow through the mixer assembly.

The sealing cartridge of FIG. 4 is similar to the cartridge of FIG. 1, except for the introduction of a spacing sleeve 23 between the selectively rupturable end portion 27 of plastic rupturable container 24 and the mixer assembly 25. The space provided by the presence of spacing sleeve 23 permits a better distribution of the curable component or components from container 24 over the inner surface 26 of the mixer assembly 25.

The cartridges normally are used in a bore hole which is slightly larger in diameter than the cartridge to facilitate insertion. The rod or bolt used to rupture the rupturable container is also selected to have a diameter slightly smaller than the bore hole and may have a rounded or conical nose portion. If the surrounding structure is relatively porous or contains fissures, it may be desirable to use a rod having a diameter very close to that of the bore hole to permit a maximum build-up of pressure upon insertion of the rod, which can assist in forcing the curing system into the pores of fissures. However, a greater difference between the hole diameter and the rod diameter will make the rod insertion somewhat easier and will allow more of the curing system to flow into the annular space between the rod and the hole. After positioning the cartridge in the hole, the operator inserts the rod or bolt until it abuts the cartridge at the end of the hole, then forces the bolt or rod into the cartridge by hand or with a hammer or by machine, with no bolt or rod rotation required for mixing the reactive components of the curable system. After the insertion is completed, the mixed system is permitted to cure without any rod rotation.

The rate at which a liquid flows through a given mixer assembly under a specific pressure and at a given temperature is dependent on its viscosity. Accordingly, if the multiple components of the curable resin system have approximately equal volumes (for example, as in FIG. 2), it is normally desirable that their viscosities be similar so that the ratio of components in the mixture initially exiting from the mixer assembly is similar to the ratio of components exiting throughout the mixing step. Similarly, if one component has a lesser volume than another component, its viscosity should be higher than the viscosity of the other, such that the relative proportion of the two components is similar as they exit the mixer assembly. If the one curable component having a lesser volume than another component of the resin system is initially contained in the mixer assembly (as in FIGS. 1 and 4), its viscosity should be sufficiently high to insure a relatively uniformly proportioned mixture exiting from the mixer throughout the mixing step. In general, therefore, each of the separate components of the multi-component curable resin system preferably has a viscosity inversely proportional to its volume, so that the ratio of the flow rates of the several components through the mixer assembly is reasonably uniform throughout the mixing step.

The practice of this invention is valuable not only for anchoring rods or bolts in solid structures but also in sealing or reinforcing the surrounding solid structures. When only sealing or reinforcement is desired, the rod can be removed from the hole before the resin cure is complete.

EXAMPLE 1

A 3.8 cm diameter disc of 0.13 mm thick aluminum foil was sprayed on one side with an adhesive, and the sprayed side was bonded to one end of a 3.15 cm outside diameter, 2.54 cm long paper tube of 0.25 cm wall thickness. The excess foil extending beyond the edge of the paper tube was bent over and adhered to the outside of the tube, thus forming a foil membrane over one end of the tube. Tests indicated that this membrane would rupture at about 1.406 kg/cm$^2$ pressure. The paper tube serving as a spacing sleeve, was then inserted, membrane covered end first, into a 22.9 cm long, 3.15 cm diameter tube of polyethylene (1.6 mm wall thickness) and positioned about one-third of the length of the polyethylene tube. Four non-woven discs, composed of a fibrous nylon non-woven web impregnated with silicon carbide abrasive particles and a resin binder (available as Scotch-Brite brand Clean 'N Strip material from Minnesota Mining and Manufacturing Company, St.

Paul, Minn., U.S.A.), each having a 3.15 cm diameter and 1.27 cm thickness were coated with a total of 22 grams of an initiator paste and then were sequentially inserted into and frictionally held by the same end of the polyethylene tube into which the paper tube had been inserted, until the first non-woven disc contacted the end of the paper tube. The initiator paste, having a viscosity greater than 200,000 cps (Brookfield LVT, #4 spindle at 3 rpm at 20° C.), consisted of:

| | Parts by Weight |
|---|---|
| 25 wt. % benzoyl peroxide in a phthalate ester vehicle (maximum viscosity 180,000 cps on Brookfield RVT with TE spindle at 5 rpm at 20° C.) | 67 |
| calcium carbonate powder, reagent grade | 33 |
| | 100 |

A tape was then drawn tightly around the outer wall of the polyethylene tube, directly over the section containing the paper tube, to effect a physical seal between the two tubes. Into the other end of the polyethylene tube was added 150 grams of the following curable resin mixture:

| | Parts by Weight |
|---|---|
| unsaturated polyester (propylene glycol/maleic anhydride polyester with 3.7 propylene oxide units per maleate unit) containing 26 wt. % vinyl toluene monomer, Brookfield LVT viscosity of 3600 cps at 20° C. #3 spindle at 12 rpm | 96 |
| N,N-dihydroxyethyl-p-toluidine | 4 |
| triphenyl stibene | 0.4 |
| ground limestone, through 325 mesh sieve (U.S. series) | 100 |

Viscosity of the resin mixture at 20° C. was 21,500 cps Brookfield LVT, 6 rpm, Spindle #4. The open end of the resin filled polyethylene tube was then closed and sealed with a metal clip, forming a sealing cartridge similar to that shon in FIG. 4.

This sealing cartridge was inserted, resin end first, into one end of a metal pipe (30.5 cm long, 3.5 cm diameter) having a steel plate welded over the other end. The inner wall of the pipe was scored to simulate a bore hole in rock. A mechanical expansion anchor was screwed onto a 1.91 cm diameter, 45.7 cm long bolt, and the resulting anchor bolt was inserted into the open end of the pipe until it contacted the sealing cartridge. It was then pushed by hand and by a hand-cranked press until a total penetration of 20.32 cm was reached, causing the foil membrane to rupture and forcing the resin into the non-woven discs, which served as a mixer, where it was mixed with the initiator paste. The larger volume of the resin moved though the mixer more rapidly than the more viscous initiator paste, thus providing a relatively constant mixture of the two components leaving the exit end of the mixer and surrounding the end of the anchor bolt. Before the resin had fully cured, tension was applied by torquing the bolt to about 100 foot-pounds (13.83 Kg-m). After one-half hour from the initial activation the sample was subjected to a tension test. In this test the bolt began to yield at 9977 kg and approached bolt failure at 14,058 kg, at which point the bolt had elongated by 3.55 cm. Upon cutting the pipe the resin was found to fill the annular space between the anchor and the pipe. The cured resin had a Shore D-2 hardness of 60–70 (70–80 after aging the sample for 2 days at room tempertature).

EXAMPLE 2

In this example, a cartridge of the type shown in FIG. 1, but containing two plastic-walled storage pouches as shown in FIG. 2, the pouches containing approximately equal parts of reactive components, each having about equal viscosity, was used. This example used a rigid, relatively non-compressibel mixing assembly as in FIG. 1, but made from glass fragments wherein the fragment sizes passed through a 3.35 mm screen opening (#6 U.S. sieve) but were retained on a #12 U.S. sieve, 1.68 mm opening, and the fragments were bonded together with epoxy adhesive into a cylinder of 3.175 cm diameter. The ratio of height to diameter of the disc was about 1:1.

The first storage pouch or Part A pouch contained 75 parts by weight of catalyzed resin of the following formulation:

| | Parts by Weight |
|---|---|
| unsaturated polyester resin (as in Ex. 1) | 200 |
| benzoyl peroxide | 4 |
| butylated hydroxy toluene | 0.1 |
| 325 mesh (U.S. sieve) ground limestone | 200 |

The viscosity of this Part A mixture was 20,000 cps measured by Brookfield LVT, #4 spindle at 6 rpm at 20° C. The Part B pouch contained 75 parts by weight of accelerated resin, as in Example 1:

| | Parts by Weight |
|---|---|
| unsaturated polyester resin | 96 |
| N,N-dihydroxyethyl-para-toluidine | 4 |
| ground limestone 325 mesh (U.S. series) | 100 |
| triphenyl stibene | 0.4 |

The viscosity of the Part B mixture was 21,500 cps as measured by Brookfield LVT, #4 spindle at 6 rpm, 20° C.

The cartridge was placed resin end first into a 3.2 cm diameter by 25 cm long metal tube which was welded on one end to a steel plate. An expandable mechanical anchor (F2B, supplied by Frazer & Jones Co., Division of Eastern Companies, Syracuse, N.Y.) was screwed onto one end of a 1.6 cm×23 cm roof bolt and placed anchor end first into the metal tube until it contacted the mixer end of the cartridge. This assembly was placed in a compression tester (MTS) and the anchor and bolt were pushed into the tube at the rate of 3 meters per minute. The pouches were ruptured, and the two resins were forced through the mixing disc and into the spaces around the mechanical anchor and roof bolt. Evidence of reaction was indicated by the presence of an exotherm after 1 minute 45 seconds.

After ½ hour the metal tube was sectioned. Visual observation indicated good reaction which was confirmed by Shore D hardness measurements ranging from 50 to 85, with an average value of 70 Shore D. Tensile strength was not measured because the test specimen was sectioned for physical measurement of the resin in an undisturbed condition, i.e., not having been subjected to any stress test.

EXAMPLE 3

Example 1 was repeated with the following changes:

1. The cartridge was made so that the intiator paste was completely contained in the spacing sleeve, and not dispersed in the mixer element as was done in Example 1. The paper spacer sleeve and aluminum membrane were painted with a solvent-based enamel to prevent migration of the phthalate vehicle (from the paste) into the paper collar.

2. The polyethylene tube was shortened so as not to surround the mixer elements. The 4 non-woven discs were lightly bonded together into a 5 cm thick cylinder with cyanoacrylate type adhesive and then a ring of cyanoacrylate adhesive on the end of the collar opposite the membrane was used to bond the mixer assembly to the spacer sleeve filled with the initiator paste.

Activation was done in the same manner as in Example 2, in a closed-end metal tube, on MTS tester in compression mode. Mix and cure were indicated by an exotherm in the activated sample at approximately 40 seconds after insertion of the anchor. As in Example 2, the activated sample was sectioned and the Shore D hardness of the resin measured as 60–75 (Average=70). Mix and cure degree appeared to be good.

What is claimed is:

1. A cartridge containing at least two segregated components of a multi-component curable resin system, which cartridge comprises:
   (a) a generally cylindrical, rupturable container containing at least one component of a multi-component curable resin system;
   (b) integral therewith, at one end of and in axial alignment with said generally cylindrical, rupturable container, a mixer comprising a liquid-permeable, three-dimensional matrix having a plurality of continuous flowpaths therethrough, essentially all of these flowpaths being non-linear; and
   (c) means for selectively rupturing said rupturable container at the end thereof adjacent said mixer, said mixer being rigid or compressible but not compressible to the extent it loses its liquid permeability under pressure sufficient to selectively rupture said rupturable container at the end adjacent said mixer.

2. The cartridge of claim 1 in which said rupturable container is collapsible.

3. The cartridge of claim 2 in which each of the separate components of said multi-component curable resin system has a viscosity inversely proportional to its volume.

4. The cartridge of claim 2 in which said rupturable container is a plastic-walled container.

5. A process for anchoring a rod in a hole which comprises
   (1) inserting into a hole a cartridge containing at least two segregated components of a multicomponent curable resin system, which cartridge comprises:
      (a) a generally cylindrical, rupturable container containing at least one component of a multi-component curable resin system;
      (b) integral therewith, at one end of and in axial alignment with said generally cylindrical, rupturable container, a mixer comprising a liquid-permeable, three-dimensional matrix having a plurality of continuous flowpaths therethrough, essentially all of those flowpaths being non-linear; and
      (c) means for selectively rupturing said rupturable container at the end thereof adjacent said mixer, said mixer being rigid or compressible but not compressible to the extent it loses its liquid permeability under pressure sufficient to selectively rupture said rupturable container at the end adjacent said mixer;
   (2) inserting a rod therein and compressing said cartridge by the force of said rod to selectively rupture the rupturable container at the end thereof adjacent the mixer assembly and to force the components of said multi-component curable resin system simultaneously through said mixer assembly and hence about the inner end of said rod, and
   (3) allowing the mixed components of the resin system to cure without rotation of said rod.

* * * * *